United States Patent Office 3,396,855
Patented Aug. 13, 1968

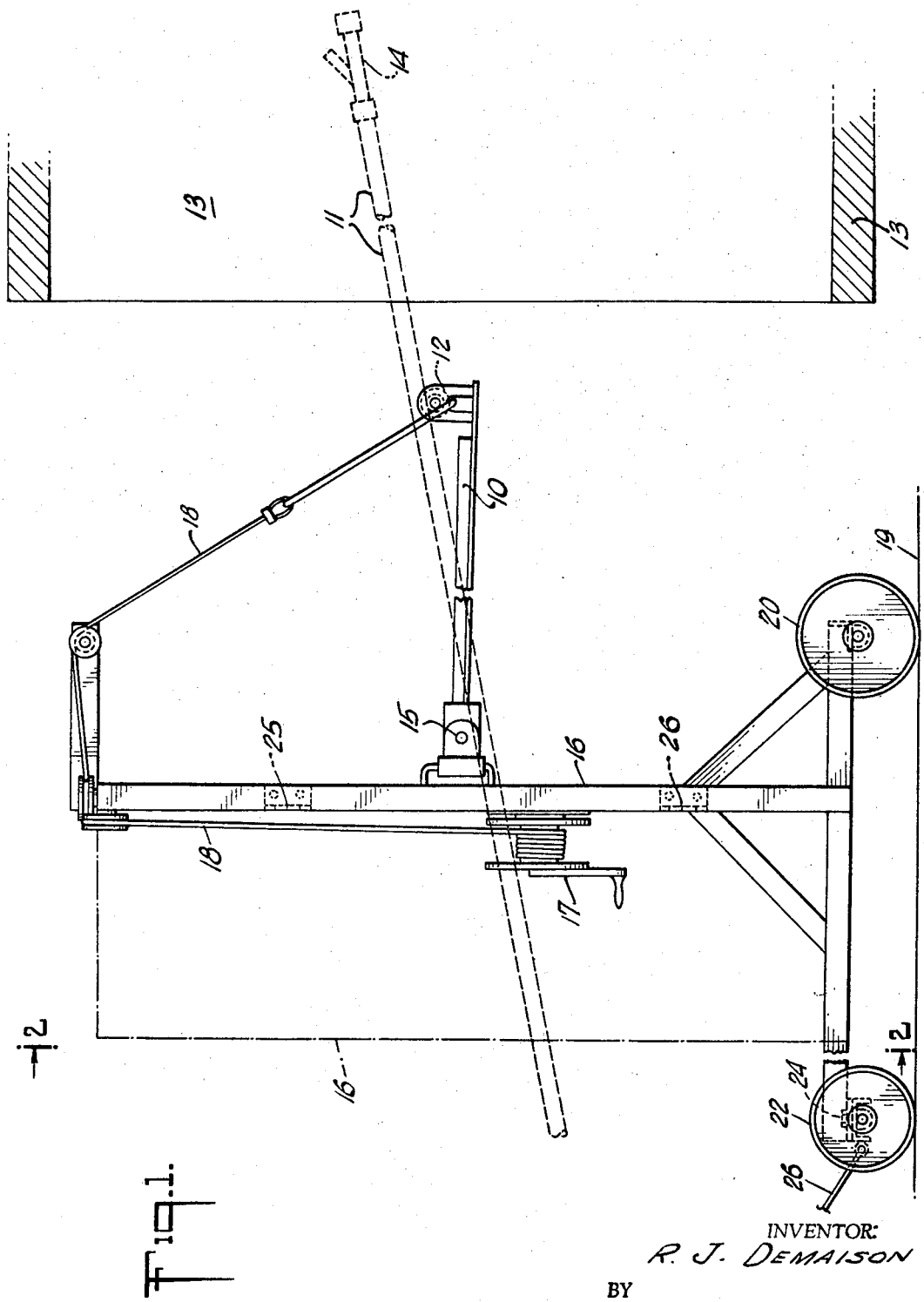

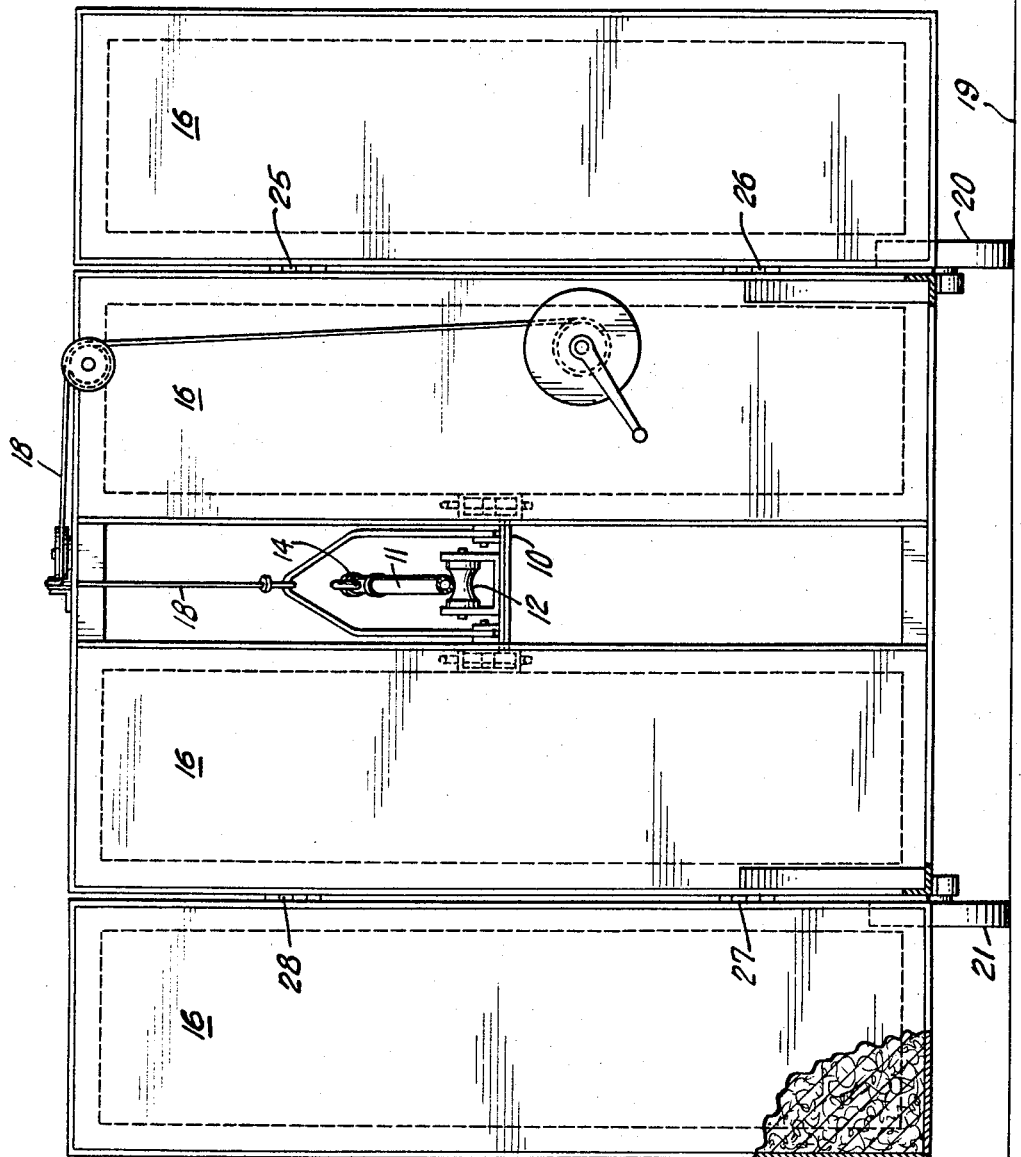

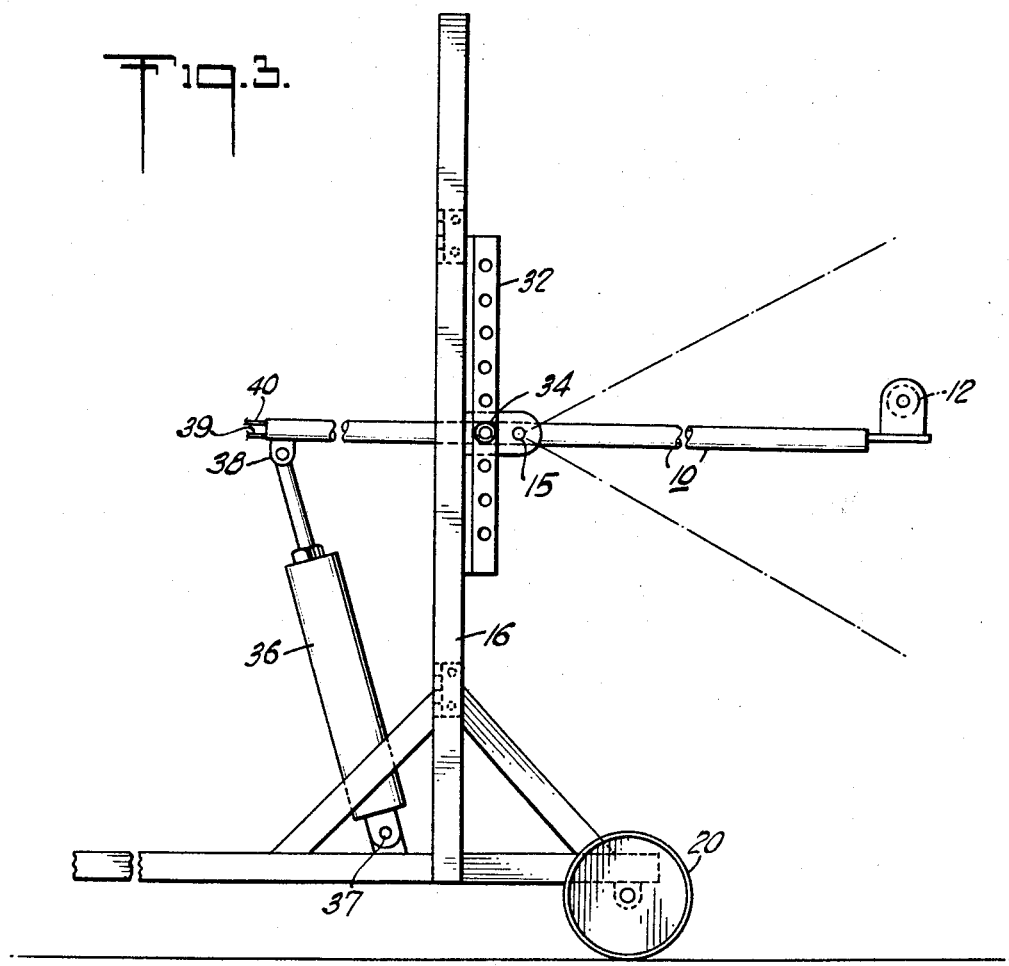
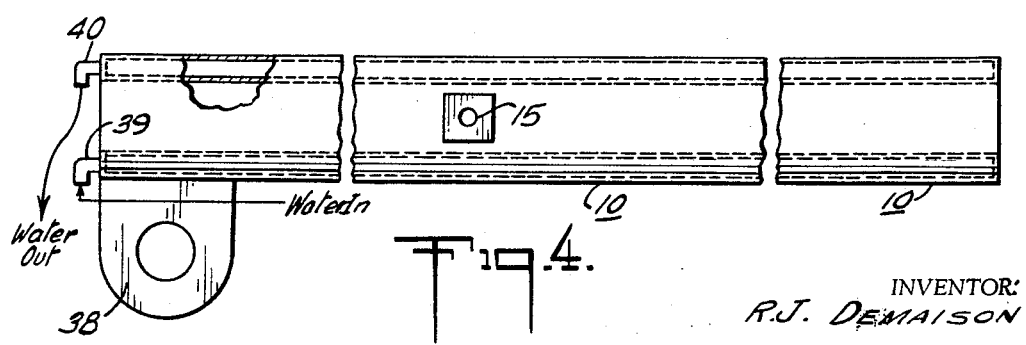

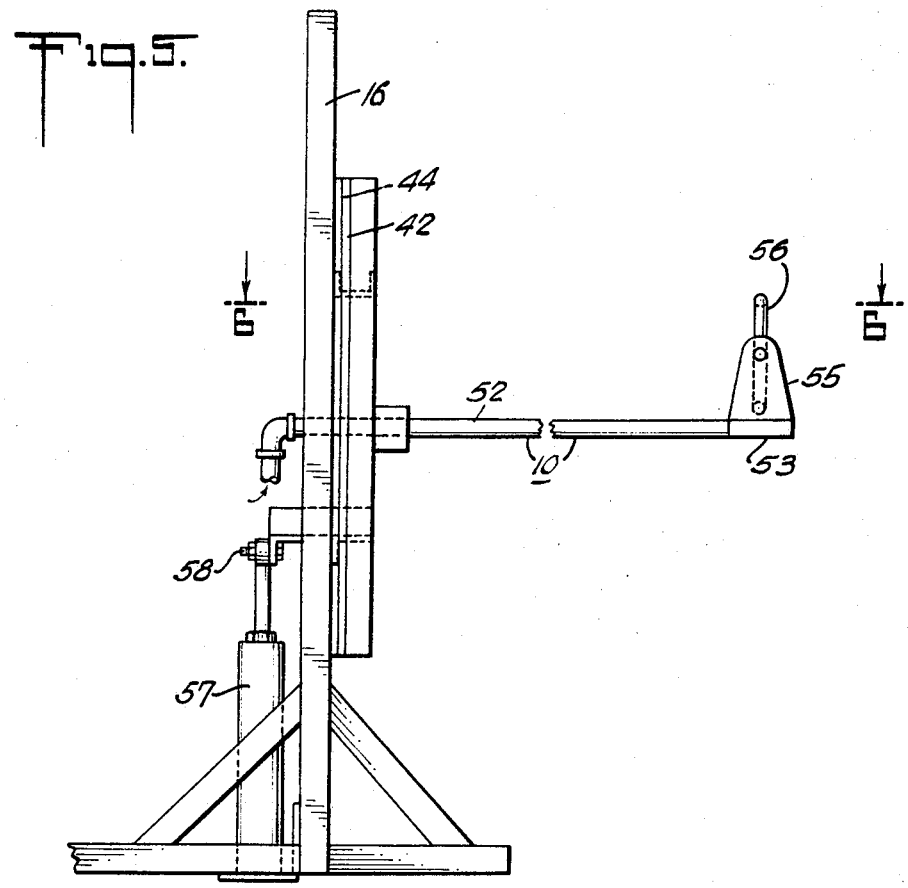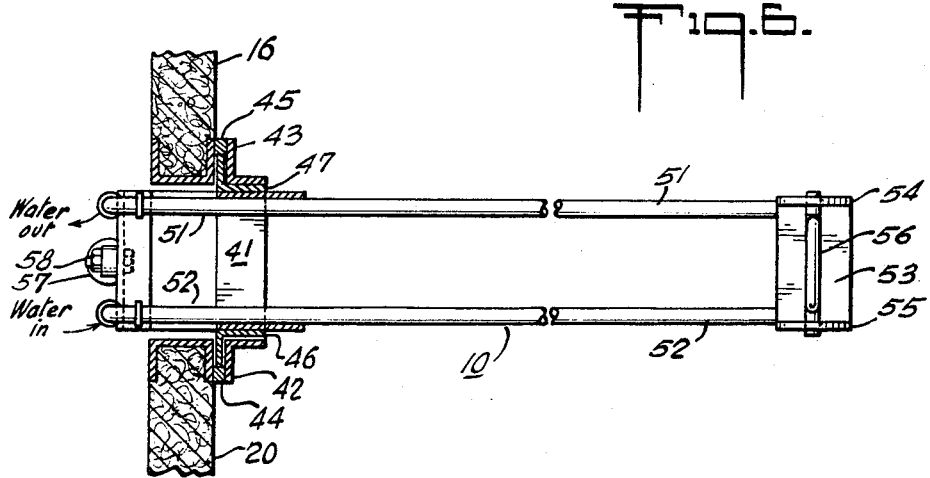

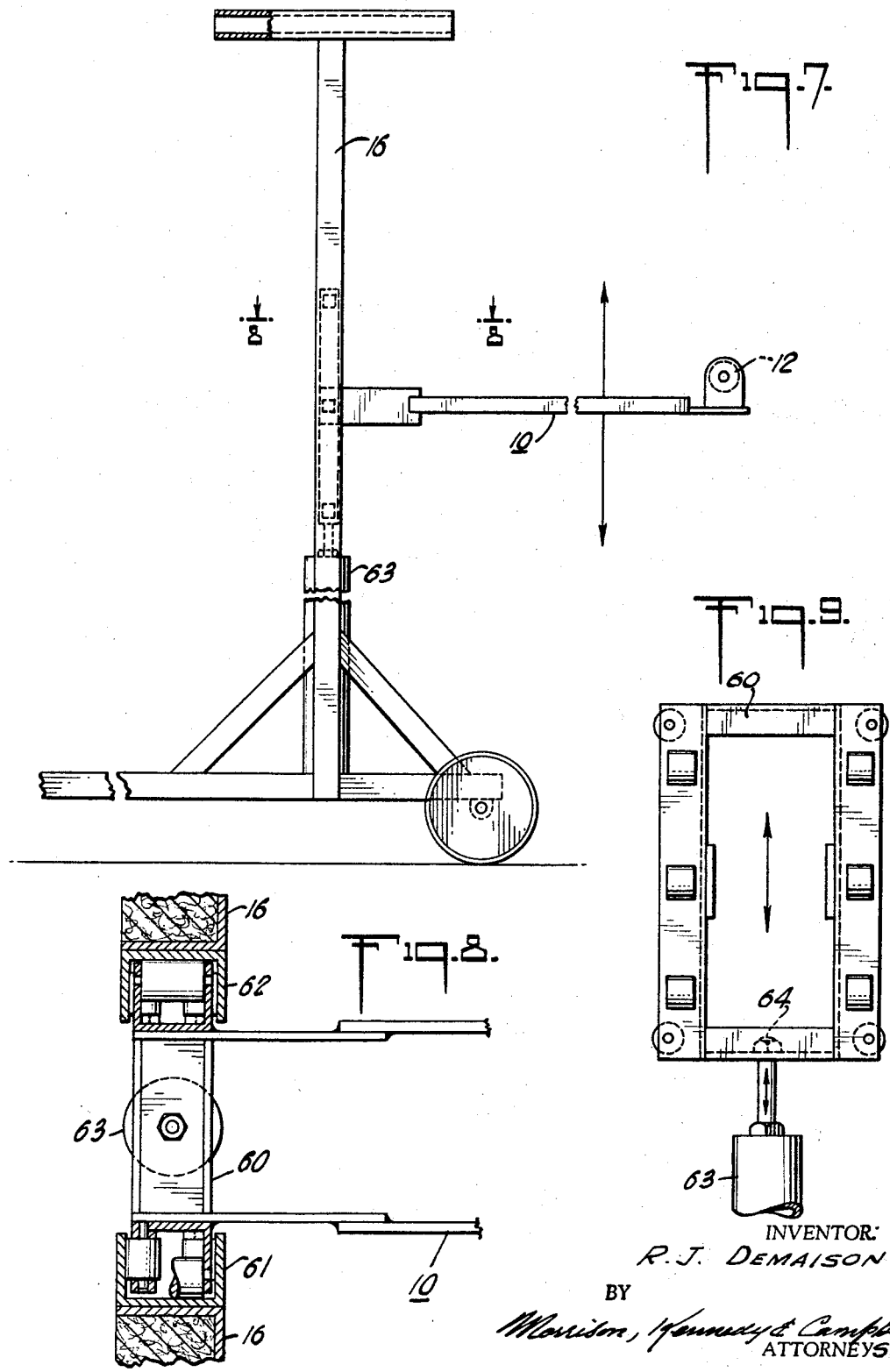

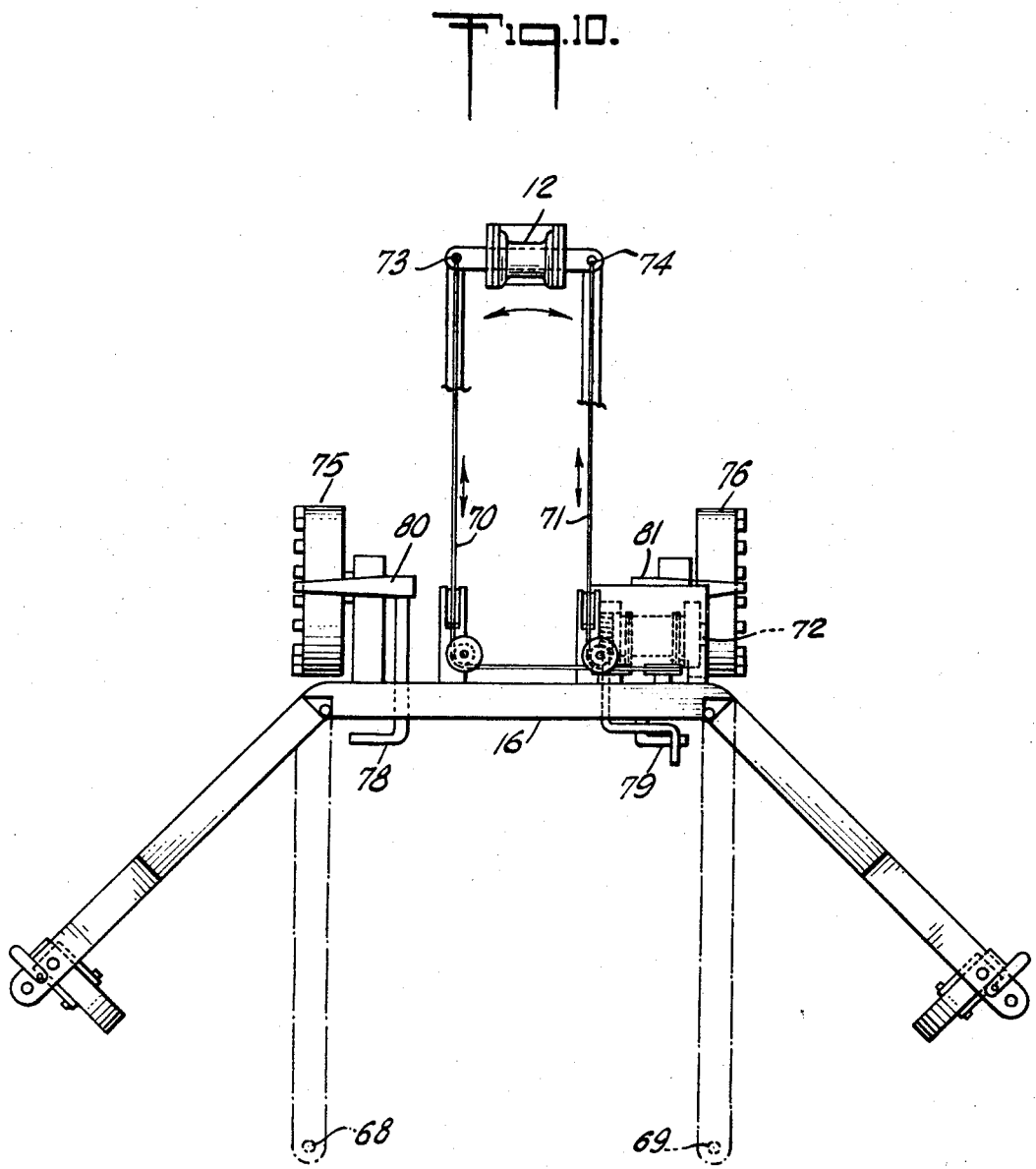

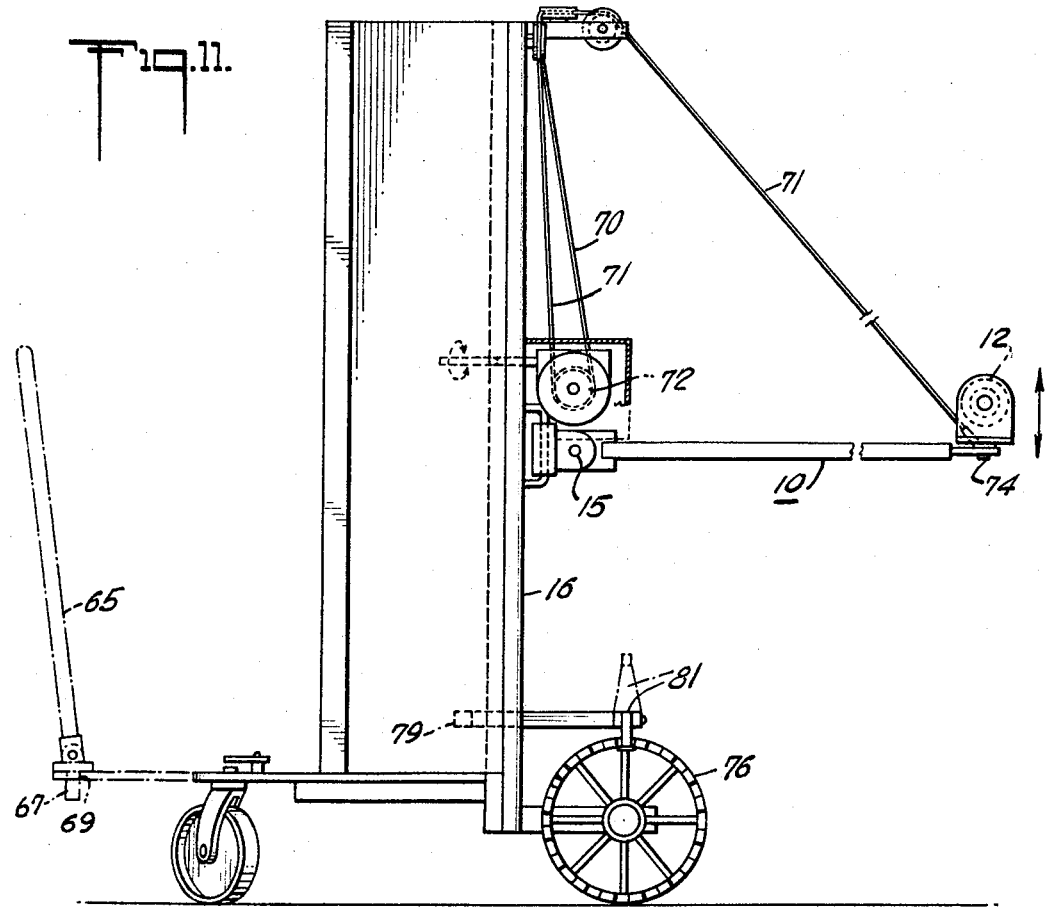
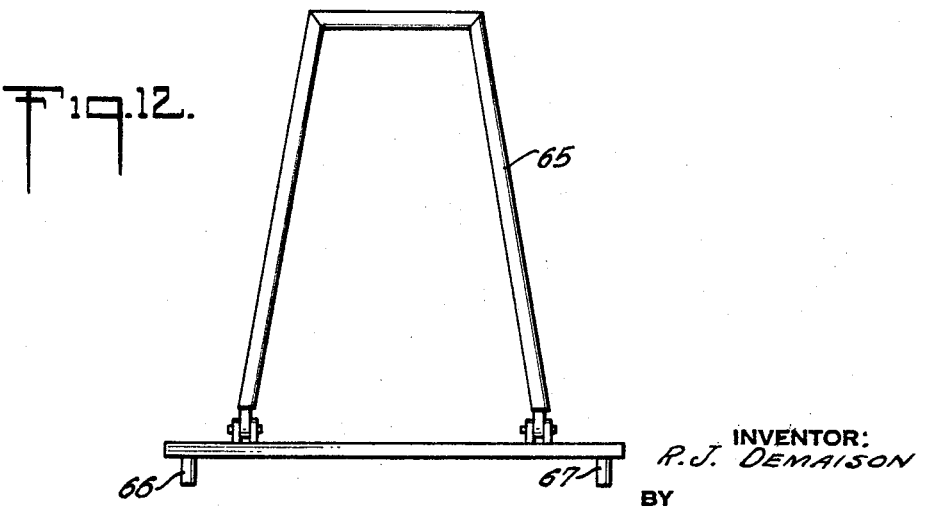

3,396,855
APPARATUS FOR USE IN APPLYING REFRACTORY COATINGS TO REFRACTORY LININGS OF SMALL BASIC OXYGEN FURNACES
Raymond J. Demaison, Bronx, N.Y., assignor to Quigley Company, Inc., a corporation of New York
Filed Oct. 1, 1965, Ser. No. 492,167
13 Claims. (Cl. 214—1)

ABSTRACT OF THE DISCLOSURE

Said apparatus comprises a mobile protective shield of the heat deflecting type carrying a rigid support for a shooting pipe, said shield being constituted by vertical panel means formed with a vertical slot for passage of the shooting pipe, and said rigid support being constituted by a boom mounted on the outside of the protective shield by a universal mounting means, guide means in the form of a concave roller mounted on the outer end of the boom, and a hand operated winch located behind the protective shield and connected by cables to the outer end of the boom.

---

This invention is directed to apparatus for use in applying refractory coatings to the refractory linings of small basic oxygen furnaces (commonly referred to as BOF's) while they are at or near operating temperatures.

In the steel mills employing the smaller sizes of BOF's in the ranges from 15 to 100 tons, and even in the larger sizes, there is sometimes very little room around and in between the furnaces which are closely grouped together when there are more than one, making it very difficult to use large pieces of equipment or apparatus in servicing the linings of said furnaces. The apparatus disclosed herein was conceived and designed to overcome these difficulties without causing a storage or moving problem.

The refractory bricks most used in basic oxygen furnaces are tar-bonded shapes or fired-shapes impregnated with tar or pitch to seal the pores and prevent the absorption of moisture. In some instances, electrically fused cast shapes are used where there is an extreme wear pattern.

The linings of the BOF's are subjected to extreme wear and erosion, as the furnaces are loaded with cold scrap, hot metal and moved during a heat. In addition, the linings are subjected to rapid and extreme temperature variations, especially during the oxygen blowing period. The slag normally formed during a heat contains a high percentage of iron oxide which is formed therein during the oxygen blowing period and causes serious erosion of the lining and produces a repeatable wear pattern if all variables remain constant.

The primary object of the invention is to provide spraying apparatus or equipment which is readily transportable and may be moved about from furnace to furnace without recourse to such cumbersome equipment as cranes, derricks, hysters, etc. In addition, the design of the apparatus is such that the space required when moving at about on the floor is kept at a minimum, eliminating the necessity of disassembling and reassembling when getting ready to use the apparatus.

Another object of the invention is to provide apparatus which will protect the operator from the furnace heat and still allow him to see what he is doing.

Still another object of the invention is to provide apparatus which is readily operable and which once set will remain in that condition until the refractory coatings have been applied and a new heat started.

A still further object of the invention is to provide apparatus which will withstand the furnace heat for prolonged periods of time without distortion or failure.

And a still further object of the invention is to provide apparatus which may be produced at minimal costs per unit and which is readily repairable in short periods of time.

The improved apparatus includes a shield which provides protection for the operator and which is made mobile in order to be able to move it from furnace to furnace. The shield is equipped with a rigid support capable of withstanding the furnace heat and provided at its outboard end with guide means wherein a suitable shooting pipe for applying refractory coatings may be rotated, moved endwise into and out of the furnace as well as rocked both vertically and horizontally when in shooting position to allow the discharge end of the shooting pipe to be located in different selected positions within the furnace. Further movement and positioning of the shooting pipe may be had by moving the outboard end of the rigid support up or down as desired.

In this manner the whole lining of the furnace may be reached and suitable protective refractory coatings applied, one over the other, to build the lining up according to the wear and erosion pattern and thus allow it to withstand a greater number of heats. It is possible to produce anywhere from 50% to 150% more heats per lining than would be possible without the coatings. The wide variation is primarily due to the different methods employed and the thicknesses of the coatings built up on the lining together with the schedule of furnace operation during which the time off periods allow for furnace spraying. If it were possible to apply the coatings continuously at exact intervals to replace what has been worn, eroded and spalled off, it would be possible to keep the linings intact for much longer periods of time as the coatings react with the slag and thus protect the parent lining from deterioration.

Other objects and advantages of the invention will readily become apparent by a thorough consideration of a preferred embodiment thereof.

Referring to the drawings:

FIG. 1 is a side view of the mobile shield carrying a rigid support which is operated by a winch and which is fitted with guide means at its outboard end whereon a suitable shooting pipe is mounted;

FIG. 2 is a rear view of the mobile shield shown in FIG. 1 and shows the shooting pipe mounted in the guide means at the outboard end of the rigid support;

FIG. 3 is a side view of the mobile shield shown in FIG. 1 but carrying a rigid support operated by means of a fluid actuated cylinder;

FIG. 4 is a side view of a water-cooled rigid support that can be used in the mobile shield shown in FIG. 3;

FIG. 5 is a side view of the mobile shield shown in FIG. 1 but carrying a water-cooled rigid support contained on a vertical slide unit operated by means of a fluid actuated cylinder;

FIG. 6 is a partial section of the mobile shield shown in FIG. 5 taken along the lines 6—6 and shows the sliding ways which allow the vertical slide unit with the water-cooled rigid support thereon to be moved up and down as desired by means of a fluid actuated cylinder;

FIG. 7 is a side view of the mobile shield shown in FIG. 1 but arranged with a rigid support contained on a vertical elevator unit operated by means of a fluid actuated cylinder;

FIG. 8 is a partial section of the mobile shield shown in FIG. 7 taken along the lines 8—8 and shows the vertically arranged channels which form the guide means in which the elevator unit with the rigid support thereon can be moved up and down as desired by means of a fluid actuated cylinder;

FIG. 9 is a front view of the vertical elevator unit shown in FIG. 7 and clearly shows the rollers used, together with the arrangement thereof, to provide smooth movement in the channels forming the guides therefor;

FIG. 10 is a top view of a mobile shield arrangement carrying a rigid support which is operated by a winch, and arranged to be locked in position and drawn by hand when moved from location to location;

FIG. 11 is a side view of the mobile shield shown in FIG. 10 and shows the wheel locking arrangement and dual cable actuating means for operating the rigid support; and FIG. 12 is a top view of the removable towing bar arranged to be fitted into the mobile shield shown in FIG. 10 when it is desired to move the shield.

In FIG. 1 there is shown the rigid support 10 for the shooting pipe 11, said rigid support 10 being capable of withstanding the furnace heat, and guide means 12 at the outboard end of the rigid support 10 wherein said shooting pipe 11 may be rotated, moved endwise into and out of said furnace, and rocked both vertically and horizontally as desired, to place the discharge nozzle 14 of the shooting pipe 11 in any selected position inside the furnace 13. As will be noted, the guide means 12 is in the form of a concave roller with antifriction bearings suitably lubricated with high temperature resistant lubricants. The rigid support 10 is fulcrummed at its inboard end, by means of the hinges 15, to the mobile shield 16 and can be raised or lowered with reference to said shield by means of the winch 17 and cable 18 which allow it to be placed in any desired angular position in a vertical plane.

The mobile shield 16, as shown in FIGS. 1 and 2, is mounted on a base frame which is movable on the floor 19 by means of the two front supporting wheels 20 and 21 and the two rear steering wheels 22 and 23 which latter are mounted on the horizontally pivoted axle 24. The shield 16 is formed in four panels, with the two outboard panels on hinges 25, 26, 27 and 28 which allow these panels to be folded back along the chassis to thus narrow the width of the mobile shield and enable it to be maneuvered on the floor between the furnaces and other necessary equipment. It will be noted that the space between the two center panels, in which the rigid support is mounted, is sufficient to allow the shooting pipe 11 to be manipulated on the guide means 12 for complete coverage of the entire inside surface of the furnace. The panels forming the shield 16 are made up of welded angles or channels and then filled with a suitable light weight insulating refractory material capable of being cast in place in the panels.

The rigid support 10 may also be arranged for bodily movement in a vertical plane as shown in FIG. 3, where the fulcrum point 15 is shiftable in a vertical plane to allow for wider variation. The fulcrum point 15 is formed by two vertically arranged angles 32 and 33 welded on each side of the panels forming the shield 16 and formed with a series of holes through any one of which the pivot bolts 34 and 35 may be inserted. The inboard end of the rigid support 10 is extended beyond the fulcrum point 15 and is actuated in a vertical plane around said fulcrum point by means of a suitable plurality of fluid actuated cylinders 36 pivoted on the base frame of the mobile shield at 37 and pivotally connected to the support 10 at 38. This same design of mobile shield may be fitted with a water-cooled rigid support 10 shown in FIG. 4 formed of two concentric tubes of suitable diameter closed at the ends to allow the shooting pipe with the spray nozzle thereon to be inserted therethrough and suitably manipulated in the furnace. The rigid support 10 will be mounted on the mobile shield by means of step bolts threaded into the holes provided at 15 to fulcrum thereon, while the actuating cylinder 36 will be connected thereto at 38. The cooling water will be fed into and out of the support by means of the elbows 39 and 40 suitably connected to a supply of cold water and a drain. The interior arrangement of the cooling water circulation can be accomplished by leading the cold water right up to the hot end and leaving it to circulate back in the sleeve to the outgoing connection. In both these versions, the fluid actuated cylinder 36 is used to position the rigid support and, being of the two-way variety, may be held in any given position for any length of time and then moved to a new position and again held by fluid pressure. This arrangement allows for a greater versatility than the arrangement shown in FIGS. 1 and 2 and in addition removes the rigid support actuating means away from the furnace heat.

The rigid support 10 may also be arranged for bodily movement in a vertical plane as shown in FIGS. 5 and 6, where the rigid support 10 is permanently fixed to the vertically arranged slide 41. The slide ways are formed of two vertically arranged angles 42 and 43 suitably spaced from the channels forming the panels of the shield 16 and suitably spaced therefrom by means of spacers 44 and 45, all welded together thereon. The vertically arranged slide 41 consists of two angles 46 and 47 extending outwardly into the two abutting spaces and containing suitable spacing means in the form of angles or channels to form a rigid slide on which the rigid support 10 is welded permanently. The rigid support 10 is formed of two pipes 51 and 52 welded to the slide 41 and having a water-cooled crossover 53 arranged to connect their outboard ends to form a water-cooling arrangement. The crossover 53 is fitted with two upwardly extending brackets 54 and 55 in which a gimbal mounted ring or yoke 56 is mounted to allow the shooting pipe to be thrust therethrough and maneuvered in the furnace. The two pipes 51 and 52 are connected to a source of cooling liquid and to a drain and the coolant circulated continuously therein to further preclude failure of the rigid support and in addition make it easier for the operator. The slide 41 is actuated up and down in the ways by means of a fluid actuated cylinder 57 anchored on the base of the mobile shield and bolted at 58 to the slide. This vertical slide arrangement also forms a means of moving the rigid support 10 in a vertical plane for movement and placement of the shooting pipe as desired.

A further means for moving the rigid support in a vertical plane is shown in FIGS. 7, 8 and 9 and here the rigid support 10 again is permanently fixed to the vertical elevator unit 60 arranged to run in two vertical channels 61 and 62 arranged on the sides of the mobile shield panels 16. The elevator unit 60 is fabricated of channels suitably fitted and welded together and then machined and roller fitted, as shown in FIGS. 8 and 9, to provide for easy vertical movement in the channels. The rollers may be fitted with either ball or roller bearings as deemed expedient and means should be provided for oiling or greasing these bearings with a special heat resisting grease. The unit 60 is actuated up and down in the guides by means of the fluid actuated cylinder 63 anchored on the mobile shield base frame and having its piston actuating rod bolted directly to the unit 60 by means of nut 64. It will be noted that the mobile shield in this disclosure is equipped with hollow sheet metal lifting pads for handling and moving the entire unit with a fork lift truck.

In all of the above units, the fluid actuated cylinders may be protected, when placed where they will be exposed to the heat of the furnace, to further insure their continued operation without changing position. In addition, the actuating cylinders may be hydraulically operated, using suitable pumps directly or air on the fluid as the pressurizing means to allow two-way movement and control.

A still further means for moving the rigid support 10 in a vertical plane is shown in FIGS. 10, 11 and 12 but in this version the mobile shield 16 is formed of three panels with the center panel containing the opening and the hinges 15 upon which the rigid support is actuated. The two outboard panels of the mobile shield are arranged to be folded back as shown in FIG. 10 and form a square to which the tow bar 65 with the two pins 66 and 67 shown in FIG. 12 may be attached at 68 and 69 and locked therein for moving said mobile shield as desired. It will be noted that this arrangement is different from that disclosed in FIGS. 1 and 2 in that the rigid support 10 is controlled by twin cables 70 and 71 actuated by a single winch 72 to insure even movement. In addition the construction is such as to allow movement in a horizontal plane as well as in the vertical plane, as the inboard end is hinged as in FIG. 1 and the outboard end containing the guide means is also hinged at 73 and 74 and not rigidly fastened together. Also the large front wheels 75 and 76 are arranged to be locked in place when the mobile shield has been suitably placed before the furnace. This arrangement is shown in dotted form in FIGS. 10 and 11 and is operative by turning the handles 78 and 79 to lift the locking arms 80 and 81 out of engagement with the wheels.

It can readily be seen that the apparatus of the instant invention is ideal for use with practically all BOF'S where space is at a premium and where it is necessary to move equipment around on the floor to service the furnaces and still repair the linings. The mobility of the protective shield and the collapsibility of its folding panels makes it possible to use the apparatus on any of the furnaces and then move it to the next one without difficulty. In addition the apparatus and equipment may be mounted on suitable power driven units to increase their maneuverability and operability. In these instances the fluid operated cylinders may be controlled from the operator's position and the wings of the shield may also be made operable by fluid operated cylinders and thus controllable by the operator.

Reference is made to my copending application Ser. No. 424,071, filed Jan. 7, 1965, which discloses different coating compositions and different methods of applying such compositions to refractory linings of basic oxygen furnaces.

What is claimed is:

1. In an apparatus for use in applying a protective refractory coating to the refractory linings of small basic oxygen furnaces while they are at or near operating temperatures in order to prolong the life of said linings, the combination of a rigid support for a shooting pipe, said support being capable of withstanding the furnace heat, a mobile protective shield of the heat deflecting type on which the support is mounted and constituted by vertical panel means formed with a vertical slot for passage of the shooting pipe, said rigid support for the shooting pipe being constituted by a boom mounted on the outside of the protective shield by a universal mounting means, guide means in the form of a concave roller mounted on the outer end of the boom, and a hand operated winch connected by cables to the outer end of the boom.

2. In an apparatus for use in applying a protective refractory coating to the refractory linings of small basic oxygen furnaces while they are at or near operating temperatures in order to prolong the life of said linings, the combination of a rigid support for a shooting pipe, said support being capable of withstanding the furnace heat, a mobile protective shield of the heat deflecting type carrying said support and constituted by vertical panel means having a vertical slot for the passage of the shooting pipe therethrough, said rigid support being constituted by a boom which is located on the outside of the protective shield and which when in operative position projects outwardly from the shield in the direction of the furnace to be treated, means for mounting the boom at its inboard end upon the shield for movement to different operative positions with reference to the shield, and guide means for the shooting pipe located on the outer end of the boom and so constituted as to permit the shooting pipe during a shooting operation to be rotated with reference to the boom and moved endwise with reference to the boom into and out of the furnace as well as rocked both vertically and horizontally with reference to the boom to alter the position of the guide means within the furnace.

3. A combination according to claim 2 wherein the inboard mounting for the boom is in the form of a fulcrum which permits a vertical rocking movement of the guide means about that fulcrum.

4. A combination according to claim 3, including a hand operated winch and a suitable plurality of cables connected to the outboard end of said boom.

5. A combination according to claim 3, including a fluid operated cylinder connected to the inboard end of the boom.

6. A combination according to claim 3, wherein the fulcrum point is adjustable with relation to the mobile shield.

7. A combination according to claim 2, wherein the inboard mounting for the boom is in the form of hinges which permit it to be moved in a horizontal plane about the hinges.

8. A combination according to claim 2, wherein the inboard mounting for the boom is in the form of a fulcrum and hinges which permit a vertical rocking movement as well as a horizontal rocking movement about the fulcrum and hinges.

9. A combination according to claim 2, wherein the inboard mounting for the boom is in the form of an elevator which is slidably arranged on the shield to permit the guide means to be raised and lowered in a rectilinear direction.

10. A combination according to claim 9, including a fluid operated cylinder arranged to move the elevator up and down on the shield.

11. A combination according to claim 2, wherein the mobile shield is mounted on wheels and is movable back and forth with reference to the furnace.

12. A combination according to claim 2, wherein the mobile shield is in the form of hinged panels which may be folded into collapsed condition, for the purpose stated.

13. A combination according to claim 2, wherein the mobile protective shield is in the form of prefabricated metal panels containing light weight insulating refractory material cast therein.

References Cited

UNITED STATES PATENTS

| | | | |
|---|---|---|---|
| 909,063 | 1/1909 | Clark | 214—132 |
| 1,479,507 | 1/1924 | Kernohan et al. | |
| 2,011,498 | 8/1935 | Miller | 266—43 X |
| 2,604,358 | 7/1952 | Richards | 239—187 |
| 3,043,448 | 7/1962 | Melton | 214—1 |
| 3,072,268 | 1/1963 | Purtell | 214—1 |

ROBERT G. SHERIDAN, *Primary Examiner.*

F. E. WERNER, *Assistant Examiner.*